United States Patent
McQueen (10) Patent No.: US 10,007,824 B1
(45) Date of Patent: Jun. 26, 2018

(54) TARGET OPTIONS FOR A DATA CAPTURE DEVICE WITH INTUITIVE AIMING INVOLVING SPECULAR OBJECTS

(71) Applicant: Datalogic USA, Inc., Eugene, OR (US)

(72) Inventor: Alexander M. McQueen, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days. days.

(21) Appl. No.: 15/480,124

(22) Filed: Apr. 5, 2017

Related U.S. Application Data (60) Provisional application No. 62/438,511, filed on Dec. 23, 2016.

(51) Int. Cl.
   *G06K 7/10* (2006.01)
   *G06K 7/14* (2006.01)
   *G06K 19/06* (2006.01)

(52) U.S. Cl.
   CPC ...... *G06K 7/10811* (2013.01); *G06K 7/10732* (2013.01); *G06K 7/1413* (2013.01); *G06K 7/1447* (2013.01); *G06K 19/06028* (2013.01); *G06K 19/06112* (2013.01)

(58) Field of Classification Search
   None
   See application file for complete search history.

(56) References Cited

U.S. PATENT DOCUMENTS

| | | | |
|---|---|---|---|
| 5,266,788 | A | 11/1993 | Yamazaki et al. |
| 9,501,677 | B2 | 11/2016 | McQueen |
| 2008/0142597 | A1 | 6/2008 | Joseph et al. |
| 2010/0051696 | A1 | 3/2010 | Liu et al. |
| 2010/0163622 | A1 | 7/2010 | Olmstead |
| 2010/0308114 | A1 | 12/2010 | Rudeen et al. |
| 2011/0309147 | A1 | 12/2011 | Barkan et al. |
| 2012/0113140 | A1 | 5/2012 | Hilliges et al. |
| 2013/0048732 | A1 | 2/2013 | Gregerson et al. |

FOREIGN PATENT DOCUMENTS

| | | |
|---|---|---|
| EP | 2988247 A1 | 2/2016 |
| WO | 2015104724 A1 | 7/2015 |

OTHER PUBLICATIONS

International Search Report and Written Opinion dated Mar. 6, 2018 in International Patent Application No. PCT/US17/67635, 9 pages.

*Primary Examiner* — Kristy A Haupt
(74) *Attorney, Agent, or Firm* — Shook, Hardy & Bacon, LLP

(57) ABSTRACT

A presentation scanner allows an operator to easily place an object being scanned within the scanner's field of view in order to enhance usability of the scanner. A partially transmitting and partially reflecting surface, like a mirror, is used. An aiming pattern or target indicator is projected from an aiming source to the surface. The aiming pattern or target indicator is seen by an operator who aligns the object, which is reflected from the surface back to the operator, to be placed over or within the aiming pattern that appears at the surface. Once aligned, a camera captures the image of the optical code.

14 Claims, 8 Drawing Sheets

TARGET OPTIONS FOR A DATA CAPTURE DEVICE WITH INTUITIVE AIMING INVOLVING SPECULAR OBJECTS

CROSS-REFERENCE TO RELATED APPLICATIONS

This application claims the benefit under 35 U.S.C § 119(e) of U.S. Application No. 62/438,511 filed Dec. 23, 2016, which is incorporated herein by reference.

BACKGROUND OF THE INVENTION

The current state of the art of fixed-position (non-handheld) optical code scanners do not rely on aiming devices to assist the operator in placing the optical code in the correct reading position. Such scanners typically require the operator to face the optical code towards the scanner and away from the operator's field of vision. Thus, an aiming beam or other targeting method, such as those used on handheld scanners, is ineffective because the operator cannot see the aiming beam or other targeting method on the optical code.

Some scanners use an aiming or "pointer" beam, which is projected onto the surface of the object being scanned. The image of this beam on the object is viewed by the operator as a reflection in the scanner's mirror. If the object being scanned has an optically diffusive surface, then the pointer beam is easily seen on the object. However, if the object being scanned is highly specular or shiny, such as a cell phone's display surface, then the pointer beam is very difficult to see.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

The present invention does not rely on the aiming device's image (i.e. pointer beam) reflecting off the object, but rather visually superimposes a directly-viewed target pattern with a reflected image of the entire object as seen in the mirror or surface.

A fixed position scanner may be created, which allows the operator to view an aiming beam or target on the optical code. As such, visual targets can be created to use with "virtual aiming" scanners. Embodiments of the present invention create a targeting or aiming pattern, in one of several different ways, that is visually superimposed over a virtual image of the optical code by use of a partially transmissive mirror. The pattern allows an operator of a scanner to easily align the optical code with the scanner's field of view, which facilitates reading the optical code.

Embodiments of the present invention allow the operator to see the optical code on an object by viewing a reflection in a mirror. Instead of having a pointer beam reflecting from the object and also visible in a mirror, an aiming device is used, which is an illuminated target indicator, reticle, or pattern, which is placed behind a negative power semi-reflective surface near the position of a virtual image of the object with the optical code. Because the targeting indicator is viewed directly through the partially transmissive mirror, rather than after being reflected from the object, the difficulty in viewing a pointer or aiming beam on specular surfaces is eliminated.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to an imaging scanner that has enhanced usability and aiming to aid an operator. Accordingly, the present invention implements a mirror to aid the operator in seeing hidden optical codes or bar codes during scanning. The mirror can incorporate see-through capability to allow a person to scan items. Further, the present invention implements an aiming pattern or aiming frame to function as a field of view for a scanning camera. The aiming pattern or aiming frame allows the operator to scan optical codes or bar codes, which appear as virtual images on the mirror.

In a first aspect, a data capture system with virtual aiming is provided that includes a scanning camera positioned to receive an image of a first item's data through a mirror having both transmissive and reflective properties. The mirror is positioned between the scanning camera and the first item. The first item's data partially shares a field of view with an operator's visual field of the mirror. The operator sees a reflection in the mirror of the image of the first item's data positioned by the operator on a first side of the mirror. An aiming pattern is transmitted towards a second side of the mirror such that that the aiming pattern appears on the first side of the mirror due to the transmissive properties of the mirror. The mirror is located so that the operator can aim the first item's data at the aiming pattern. The operator has a first line of sight to the first item's data from the reflection in the mirror. The operator aligns the first item's data with the aiming pattern on the first side of the mirror so that the scanning camera has a second line of sight to the first item's data. The scanning camera captures an image of the first item's data.

In another aspect, an imaging scanner with enhanced usability and aiming is provided that includes a scanning camera positioned to receive an image of a first item transmitted through a mirror. The mirror has a partially reflecting and partially transmitting coating. The scanning camera sees the image of the first item through the mirror where the first item is positioned by an operator on a first side of the mirror and the scanning camera is on a second side of the mirror. The mirror is located so that the operator can position the first item's data and the operator can aim the first item's data at the scanning camera. The operator has a first line of sight to the first item's data through a reflection on the first side of the mirror and the scanning camera has a second line of sight to the first item's data from the second side of the mirror. The mirror is also located so that the operator positions the first item's data such that the scanning camera sees the first item's data through the mirror.

In yet another aspect, an imaging scanner with enhanced usability and aiming is provided that includes a scanner window formed in a spherical shape and coated with a partially reflective layer. The scanner window forms a virtual image of an optical code that is located a distance from the imaging scanner. An aiming frame, which is illuminated and originates from an aiming source, shows a field of view of a scanning camera on the scanner window. The scanning camera captures the virtual image of the optical code when the optical code is positioned so that the virtual image of the optical code is placed in or over the aiming frame at the scanner window.

Implementations of an embodiment of the present invention include an enhanced aiming mirrored scanner that uses a convex (negative optical power) partially reflective mirror for an operator to view a reflection of an object. The fairly strong negative power of the optic and its close relative position to the object being viewed allows the mirror to operate as a field optic, greatly increasing the field of view over which the object being scanned can be seen. The scanning camera is placed behind the partially transmissive mirror and views the object through this surface. In the context here, a transmissive mirror is one where something, such as light, can be seen through the mirror. Additionally, a partially transmissive mirror is one where something can be seen through the mirror as well as can be reflected in the mirror.

In implementations of embodiments of the present invention, the mirror is formed as a convex thin shell, which may have a surface figure which is spherical or aspherical in nature. Because the mirror is a thin shell with essentially locally parallel surfaces, a camera may view the object through this surface with very little induced aberrations.

A targeting indicator is typically an illuminated pattern, which is placed approximately where the virtual image of the object being scanned is focused. Sometimes, the targeting indicator is referred to as an aiming pattern or aiming frame. The target pattern is viewed through the partially transmissive surface and is seen by the operator as being superimposed on the virtual reflected image of the object being scanned. The operator may align the object's optical code to the target indicator in order to ensure that the optical code is centered to the scanning camera's field of view. In other embodiments, the targeting indicator can be an unilluminated pattern drawn on or near a surface, such as a mirror.

Targeting indicators can include a pattern of light emitting diodes (LEDs) arranged in a way to enhance aiming. Other targeting indicators can include patterns such as a rectangle, a circle, nested rectangles, concentric circles like 'bulls-eye', crosshairs, an 'X', arrows, spirals, and asterisks, to name a few. Other patterns may be contemplated, which are not mentioned here. Enhancements may be made to the targeting indicator such that it changes character upon a successful decoding of data on the presented object. This may include changing the color of the targeting indicator, its brightness, or rate of duty cycle of flashing.

In an implementation of an embodiment of the present invention, the targeting indicator is normally flashing one color on and off, for example blue, at a moderate rate, such as one Hertz, in order to call more attention to proper aiming of the object to be read. When a successful read occurs, the indicator may switch to a green color, for instance, and hold this state continuously on for a longer period, say 1.5 seconds, and then return to the targeting mode of a blue one Hertz flashing condition.

Figure 1:
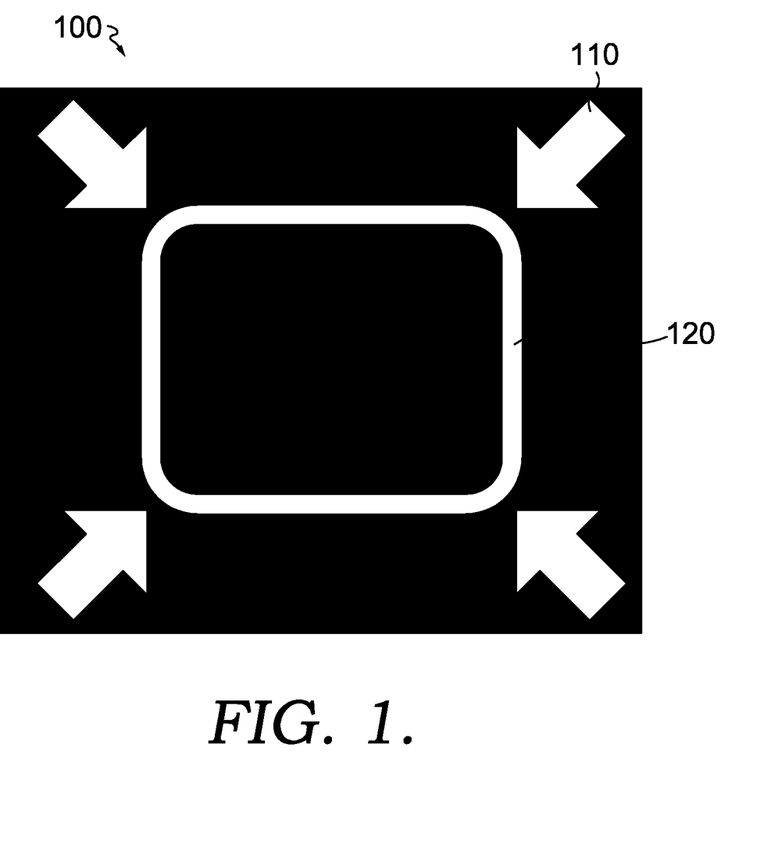
FIG. 1 is an exemplary graphic target with etched arrows and rectangular item, implemented in accordance with an embodiment of the present invention.

In FIG. 1, a graphic target 100 is shown that is used to provide a target indicator when illuminated. Graphic target 100 may be an opaque target where bright areas are a light reflective color, which is suited for front illumination. Alternatively, the bright areas may be made transparent or translucent, or maybe used with back illumination. Front illumination means that some type of light shines on the front surface of graphic target 100. Back illumination means that some type of light shines on the back surface of graphic target 100. With graphic target 100, the bright areas include arrows 110 and rectangular pattern 120. As one of ordinary skill in the art understands, the bright areas may be made of different designs and shapes.

Figure 2:
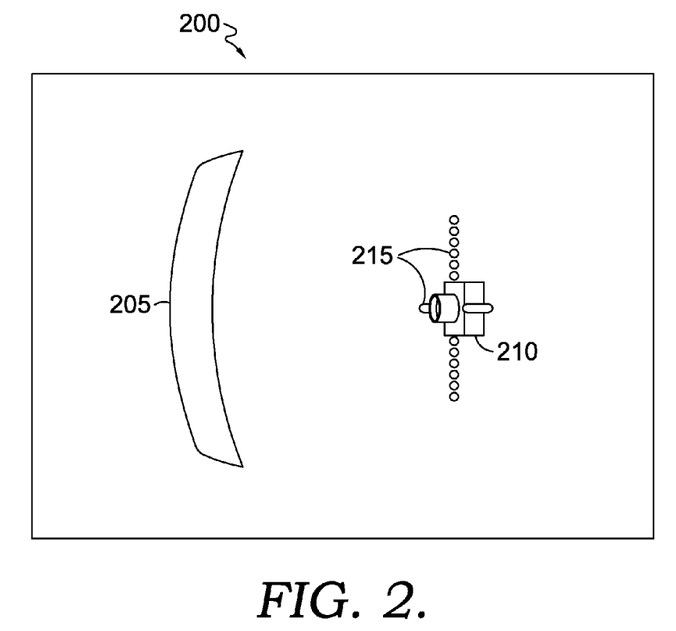
FIG. 2 is an exemplary scanning system with a set of LEDs, implemented in accordance with an embodiment of the present invention.

Turning to FIG. 2, an exemplary scanning system 200 is shown with a mirror 205, which is partially transmissive and partially reflective, a camera 210, and an arrangement of LEDs 215. Mirror 205 is located in front of camera 210 and LEDs 215. Camera 210 can capture an image of an object that appears on the left side of mirror 205. As shown, all the components of system 200 are shown to the right side of mirror 205. Because of the transmissive nature of mirror 205, camera 210 captures the image in its field of view. LEDs 215 project an aiming pattern through mirror 205, which can be seen through mirror 205 due to the transmissive and reflective properties of mirror 205. Camera 210 and LEDs 215 can be connected together, located together but not connected, or located in proximity to each other. This proximity is dependent on and limited to the size of the housing that contains scanning system 200.

Camera 210 can be a solid state camera or another type of camera that can capture images. More particularly, camera 210 is also referred to as a scanning camera. Camera 210 can scan or read optical codes, bar codes, or other data that are located on items or packages placed within the scan zone at scanning system 200.

The location and angle of camera 210 are fixed relative to mirror 205. This means that as mirror 205 is moved or adjusted, camera 210 maintains the same relative position to mirror 205.

An alternative embodiment to the arrangement of LEDs 215 is to use a simple illuminated target graphic, which is front- or back-illuminated. This graphic may be a simple printed pattern, similar to the one described in FIG. 1, or it may contain another kind of printable graphics and/or characters. These graphics and/or characters may include, but are not limited to, a rectangle, a circle, nested rectangles, concentric circles (i.e. 'bulls eye'), crosshairs, an 'X', arrows, spirals, and asterisks, to name a few. Simple instructions may be printed as well. In addition, various colors may be used for added emphasis. Also, various colors of the illumination may be sequenced on and off so that the colors of the graphic become visible or not, thus, adding more flexibility to the display of information for targeting or other purposes.

Figure 3:
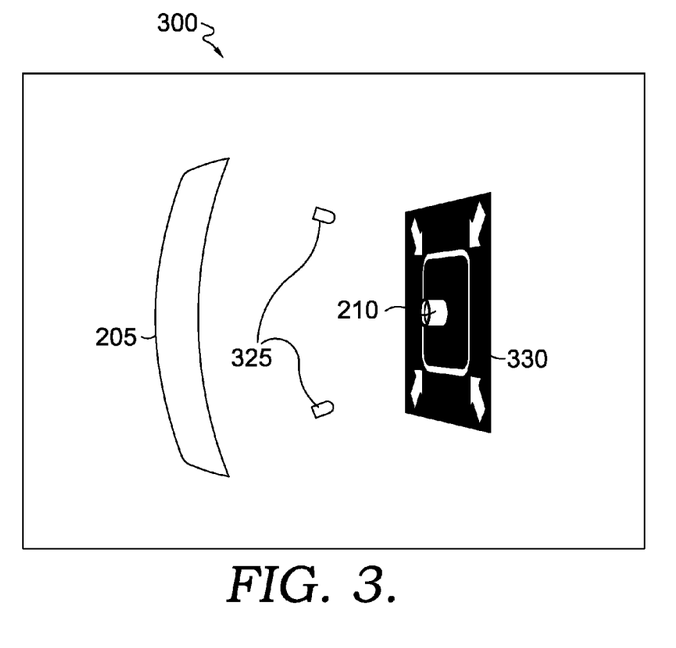
FIG. 3 is an exemplary scanning system with a graphic target, implemented in accordance with an embodiment of the present invention.

In FIG. 3, an exemplary scanning system 300 is shown with mirror 205, camera 210, a graphic target 330, and LEDs 325. Mirror 205 is located in front of camera 210, LEDs 325, and graphic target 330. Camera 210 captures an image of an object that appears on the left side of mirror 205. As shown, all the components of system 300 are shown to the right side of mirror 205. Because of the transmissive nature of mirror 205, camera 210 captures the image in its field of view. LEDs 325 project a front illumination onto graphic target 330 causing the aiming pattern or aiming frame from graphic target 330 to be visible through mirror 205. The aiming pattern or aiming frame can be seen through the mirror 205 as discussed above. Graphic target 330 is similar to graphic target 100 discussed in FIG. 1. Camera 210 and graphic target 330 can be connected together, located together but not connected, or located in proximity to each other. Similarly, as discussed above, the proximity is dependent on and limited to the size of the housing that contains scanning system 300.

Figure 4:
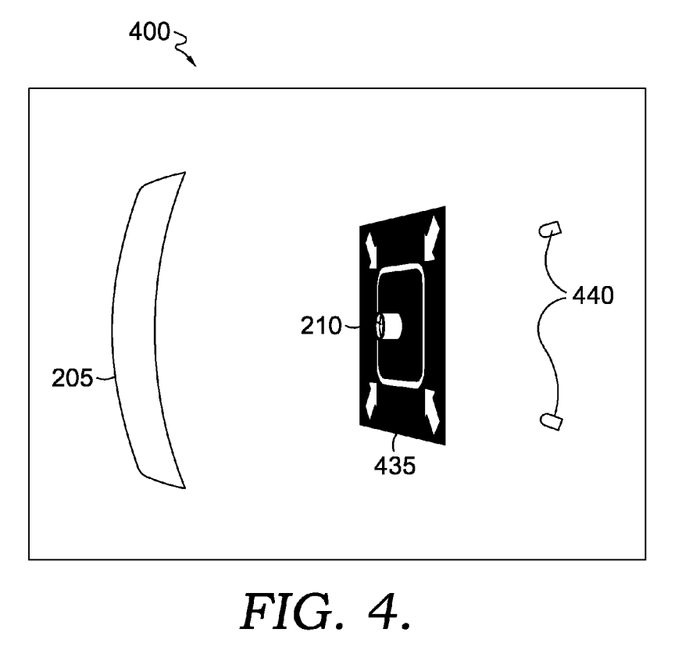
FIG. 4 is another exemplary scanning system with a graphic target, implemented in accordance with an embodiment of the present invention.

Continuing with FIG. 4, an exemplary scanning system 400 is shown with mirror 205, camera 210, a translucent target 435, and LEDs 440. Mirror 205 is located in front of camera 210, translucent target 435, and LEDs 440. Camera 210 captures an image of an object that appears on the left side of mirror 205. As shown, all the components of system 400 are shown to the right side of mirror 205. Because of the transmissive nature of mirror 205, camera 210 captures the image in its field of view. LEDs 440 project a back illumination onto translucent target 435 causing an aiming pattern or aiming frame to be projected from translucent target 435 through mirror 205. The aiming pattern or aiming frame can be seen through mirror 205 as discussed above. Translucent target 435 is similar to graphic target 100 discussed in FIG. 1. Camera 210 and translucent target 440 can be connected together, located together but not connected, or located in proximity to each other.

Another alternative embodiment to LEDs 215, graphic target 330, and translucent target 435 for creating an aiming pattern or aiming frame is an edge illuminated transparent plate with a design etched into the plate's surface. This technique is based on the principle of frustrated total internal reflection, whereby light launched into the edge of the plate will propagate through the plate and 'leak out' wherever the surface is etched. The edge illumination may be monochromatic, or may be of multiple colors. The colors may be sequenced for additional attention-getting. Multiple plates with different patterns may be stacked so that patterns may be alternately selected in time. The sequencing of multiple plates may also give a three-dimensional sequencing effect because of the different distances of each from the operator.

Figure 5:
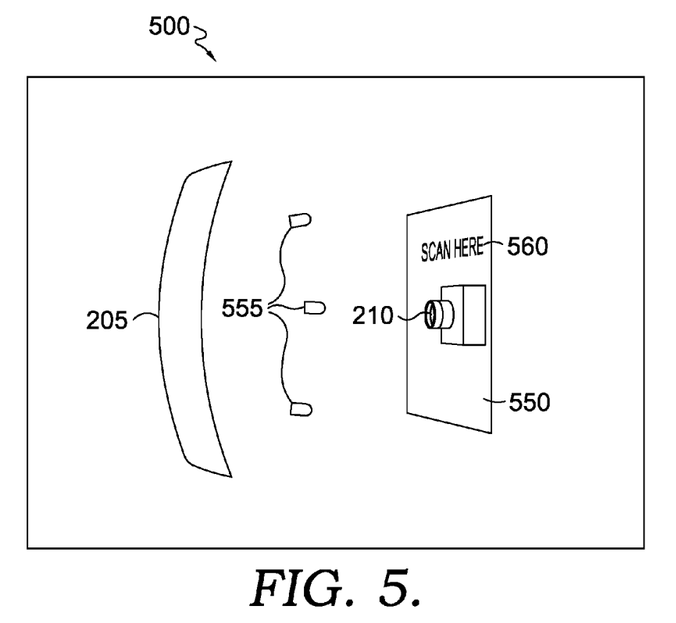
FIG. 5 is an exemplary scanning system with a plate, implemented in accordance with an embodiment of the present invention

In FIG. 5, an exemplary scanning system 500 is shown with mirror 205, camera 210, a transparent or semi-transparent plate 550, a targeting pattern 560, and LEDs 555. Mirror 205 is located in front of camera 210, plate 550, LEDs 555, and targeting pattern 560. Camera 210 captures an image that appears on the left side of mirror 205. As shown, all the components of system 500 are shown to the right side of mirror 205. Because of the transmissive nature of mirror 205, camera 210 captures the image in its field of view. LEDs 555 illuminates the edges of plate 550 causing target pattern 560 to be visible through mirror 205. Target pattern 560 can be seen through mirror 205 as discussed above. Camera 210 and plate 550 can be connected together, located together but not connected, or located in proximity to each other.

In various embodiments discussed above, geometrical shapes, text, or a combination of both can be implemented to clearly define the target scan zone at mirror 205 for camera 210 and an operator, where camera 205 and the operator are located on opposite sides of mirror 205. Additionally, mirror 205 can be flat or concave. Mirror 205 can be a lens or surface that has been coated to provide reflective properties but also retain the transmissive properties. In other embodiments, mirror 205 can be fully reflecting, but also contain an aperture for camera 210 to view an object through the aperture put in mirror 205.

Figure 6:
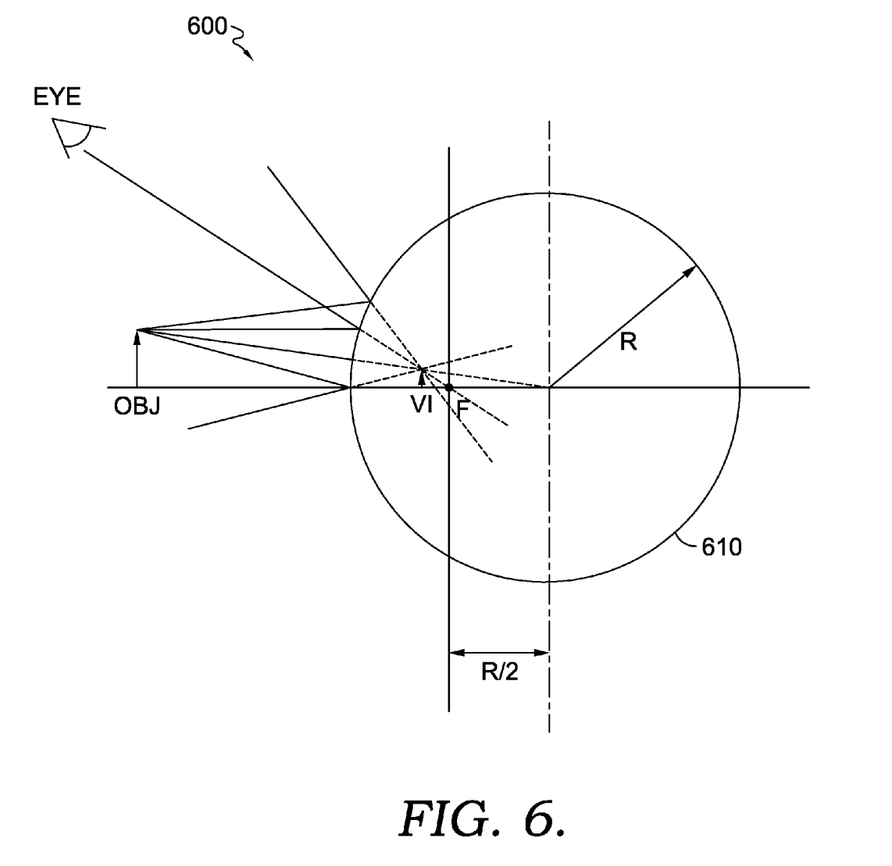
FIG. 6 is a diagram of virtual image formation in accordance with an embodiment of the present invention.

In FIG. 6, a virtual image formation concept 600 is shown with a convex reflective surface 610. Surface 610 has a radius r and is coated with an optically reflective material. This "optic" has a focal point f, which is at a distance r/2 from the center of the circle or spherical shape for surface 610. The object obj, when viewed by an operator at eye, by way of the reflection from surface 610, appears as a virtual image at vi.

Figure 7:
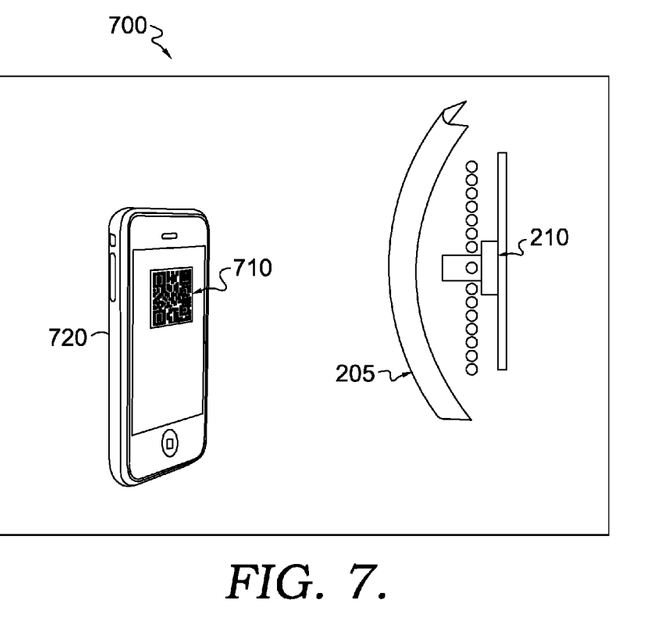
FIG. 7 is an implementation of FIG. 2 depicting the scanning of a cell phone display.

Turning now to FIG. 7, scanning system 200 is shown in a position to scan a cell phone display object 710 of a cell phone 720 in an illustration 700. Object 710 is viewed through mirror 205, which is a partially transmitting and partially reflecting optical element, by camera 210.

Figure 8:
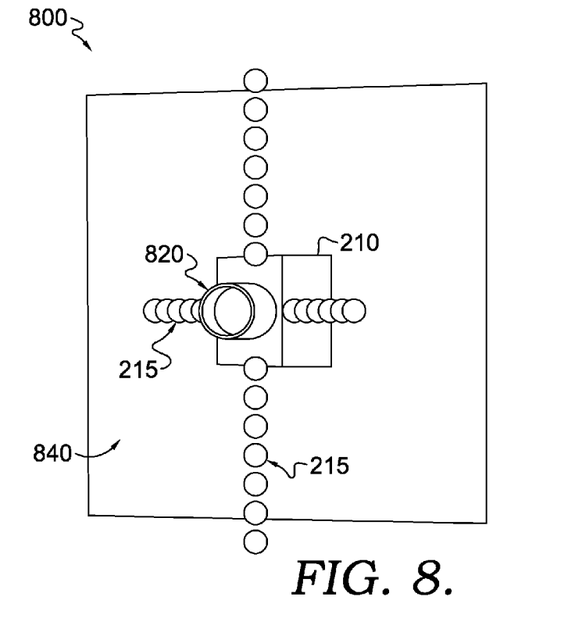
FIG. 8 is an exemplary scanning camera with a set of LEDs as target indicators, implemented in accordance with an embodiment of the present invention.

In FIG. 8, an illustration 800 shows internal components of scanning system 200. Scanning camera 210 has a circuit board 840 and a lens and imager assembly 820. Additionally, LEDs 215, which are used as a target indicator, are shown connected to scanning camera 210.

Figure 9:
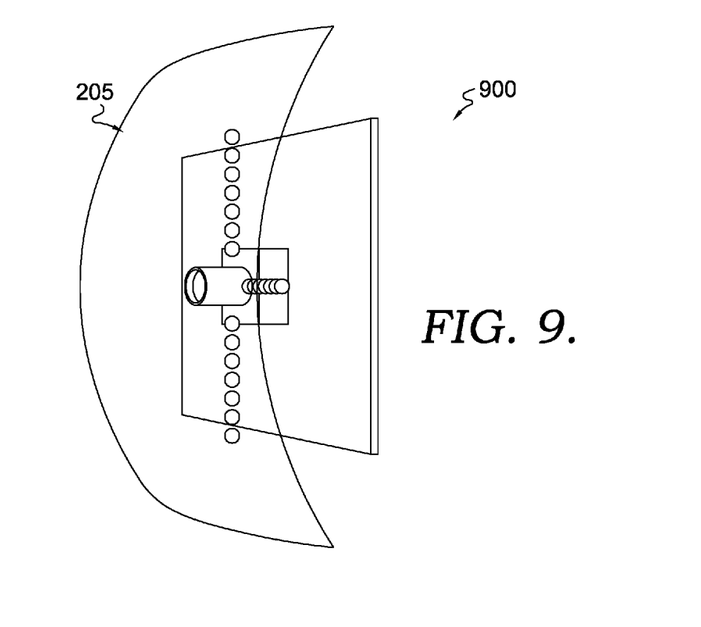
FIG. 9 is another exemplary scanning system with a set of LEDs depicting the physical relationship between the elements, implemented in accordance with an embodiment of the present invention.

FIG. 9 demonstrates the nature of the partially transmitting and partially reflecting optical surface (i.e. mirror 205) and its relationship to scanning camera 210. The targeting indicator is placed roughly in the vicinity of the virtual image, which occurs on the concave side of the surface.

Figure 10:
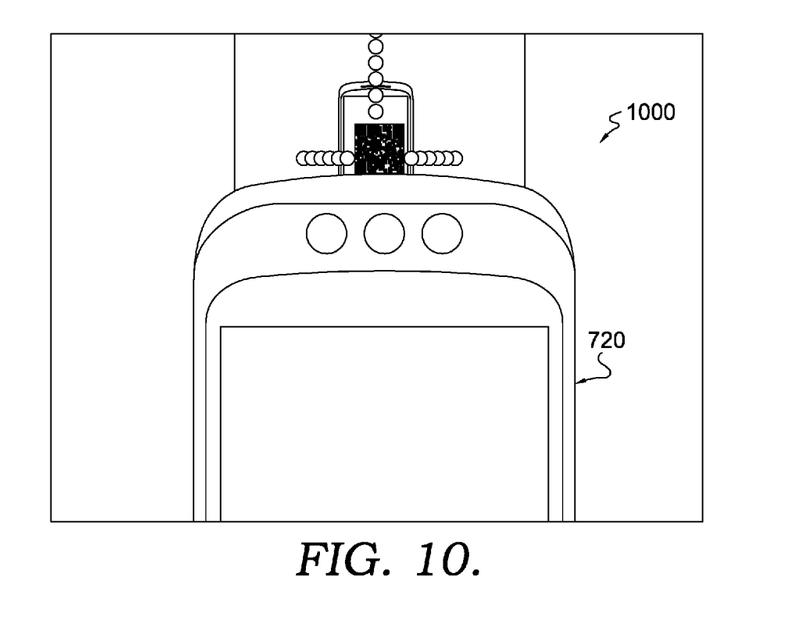
FIG. 10 is an image of a cell phone display positioned at a height of 42 inches from the ground and located 2.5 inches from a reflecting object, with an observer seeing the reflecting object at an eye height of 48 inches from the ground.
Figure 11:
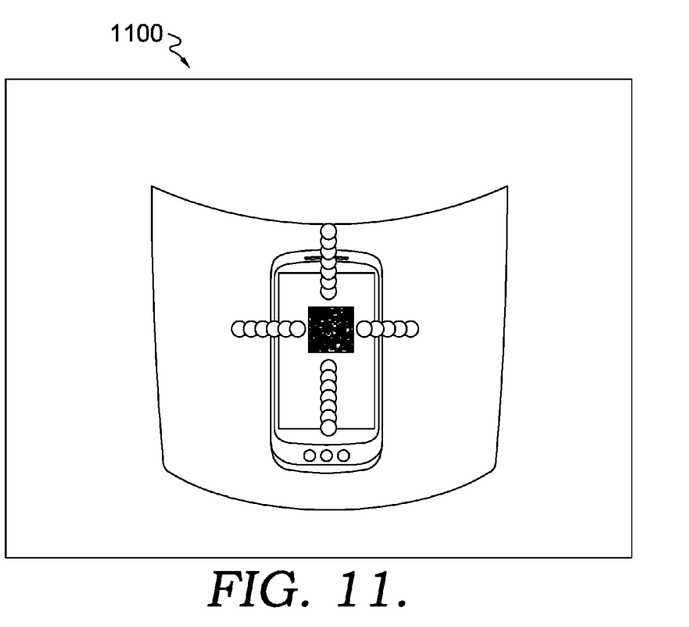
FIG. 11 is an image of a cell phone display positioned at a height of 42 inches from the ground and located 2.5 inches from a reflecting object, with an observer seeing the reflecting object at an eye height of 60 inches from the ground.
Figure 12:
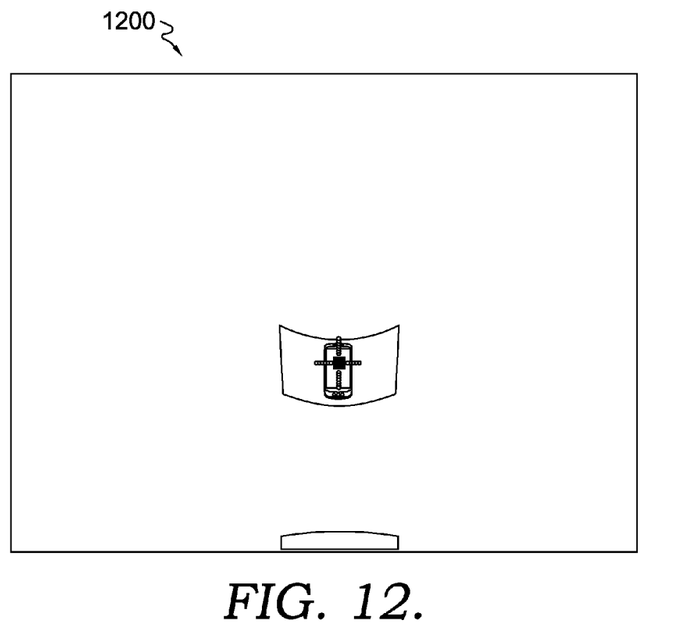
FIG. 12 is an image of a cell phone display positioned at a height of 42 inches from the ground and located 2.5 inches from a reflecting object, with an observer seeing the reflecting object at an eye height of 72 inches from the ground.

FIGS. 10 through 12 are simulation images of what observers of various heights would see with a cell phone held at the same desired location for all. In the example here, the cell phone 720 is located 42 inches above the floor and is located 2.5 inches away from the reflecting optic. FIG. 10 shows what a person with an eye height of 48 inches would see. FIG. 11 shows what a person of an eye height of 60 inches would see. FIG. 12 is the result for a person with an eye height of 72 inches. Notice that over an eye height range of 30 inches, the offset error between the display virtual image center and the targeting indicator is very small, which shows the robust nature of the invention.

From the descriptions above, the core idea is to use the scanner window itself, preferably formed in a spherical or convex shape, and coated with a partially reflective layer, to form a virtual image that can be seen by the user, without changing the scanner's shape and basic components. An aiming frame illuminated either by a slab type LED illumination or a back/front illuminator shows the user the usable field of view of the camera. In some cases, the back illuminator is switched off during camera acquisition.

A reduction in transmitted power caused by having a partially reflective window is not considered an issue and can be compensated by a flash illuminator placed behind the window. When a cell phone or other device is presented, no illumination is needed because of the amount of illumination at the cell phone display.

Figure 13:
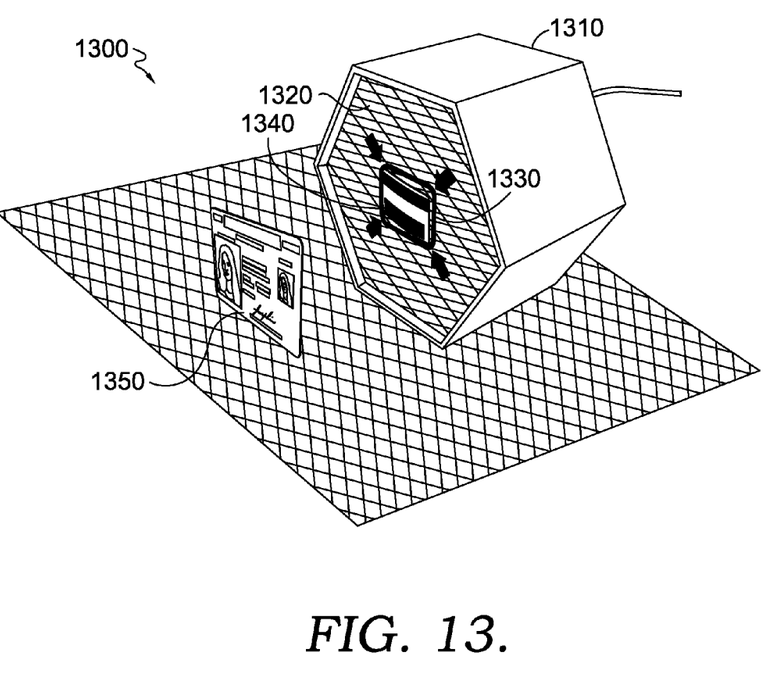
FIG. 13 is an exemplary scanning device illustrating a surface with a transmissive feature showing the boundary line and arrows and a reflective feature showing the reflection of the identification card, implemented in accordance with an embodiment of the present invention.

Turning to FIG. 13, an illustration 1300 shows a scanning device 1310 scanning data from an identification card 1350. Scanning device 1310 includes a surface 1320 (which is similar to mirror 205). Surface 1320 has a transmissive feature that allows a targeting indicator 1330 originating from a targeting source inside of scanning device 1310 to be visible to a user as a rectangular boundary line and arrows. Additionally, surface 1320 has a reflective feature that shows a reflection 1340 of the data on the back of identification card 1350.

Although not shown, scanning camera 210 is located inside scanning device 1310. One embodiment can be established where scanning camera 210 sees and captures the data on the back of identification card 1350 by seeing through surface 1320 due to surface 1320's transmissive feature. Another embodiment can be established where scanning camera 210 sees and captures the data on the back of identification card 1350 by seeing through an aperture made through surface 1310. In this case, scanning camera 210 does not depend on the transmissive feature of surface 1310 to see the data on the back of identification card 1350. In either embodiment, scanning camera 210 and the targeting indicator have the same or similar lines of sight.

In another embodiment, the back illuminated aiming pattern 1330 indicates to the user the extension of scanning camera 210's field of view. The partially reflecting surface 1320 shows the user code 1340 as a reflection. So, proper distance can be selected in order to frame the whole code 1340 inside pattern 1330. Aiming pattern 1330 is generated by the various types discussed above.

Continuing with FIG. 13, the coating on surface 1320 can be done on the interior (concave) side of surface 1320 to protect it from wear. As an advantage, in scanner 1310 with a small window such as surface 1320 (i.e. reflective curved window), one can understand how far away a label must be in order to be completely in camera's 210 field of view. Rather than center aiming, this feature provides advantages to compact presentation scanners.

One method can be to have the shortest dimension of the field of view at near field be somewhat larger than the longest dimension of the largest desired label. Once this is determined, the dimension at the near field distance is transferred to the virtual image at surface 1320, where it will be smaller by the magnification factor. If the illuminated target (i.e. back of identification card 1350) is at the virtual image, then the smaller dimension of the target should match the virtual image dimension. Camera 210's lens can be calculated to match the field of view at near field distance, and placed accordingly. At some distance, the targeting indicator and the object line up.

As an example, the cell phone captures indicated by FIGS. 10-12 are used at 5.4 millisecond exposure pulse, as measured on the aimer LED current sense resistor. There is no illumination LED on through one of the 100 millimeter coated mirrors, which is approximately a 7 millimeter effective focal length (EFL) lens wide open, which is about an f/2.5 to f/3.

In using a prototype with the SixKi decoding application, the scanner seems quite usable as a presentation-mode device with current 5.4 millisecond exposure, no illumination, f2.8 or so. Because these settings give a decent image in typical office ambient for a typical label, they also work quite well for label images on the cell phone without changing anything. The simplifying principle is the fact that this is presentation-mode only, where there is no sweeping. Because of the box-style virtual aiming target that appears on the mirror or surface, one tends to not sweep while attempting to place the label within the box. Another helpful fact is that despite the narrow depth of field due to the low f-number, one can fairly easily see when the virtual image of the label is in the plane of the target, which is "near best focus." It is very easy to bring the label in, line it ups with the box, and position it at the right distance for reading. Some ambient light may be reflected onto the label as the label gets close to the mirror. If no illumination is required, there may not be a need for a special cell phone mode.

In another embodiment, a set of barcode illuminator LEDs can be placed external to the mirror or surface, facing towards a potential non-illuminated display barcode (i.e. label). The LEDs could be hidden from a user's or operator's eyes, but would illuminate the field at some rate. The idea would be to switch between a short exposure with these illuminators on for paper-type labels, and a longer non-illuminated exposure when looking for self-illuminated displays such as a cell phone. The ratio of frames of these two modes could be adjusted to match the expected mix of types depending upon the application. In both modes, the internal target graphic illuminators would be turned off during camera exposures.

As discussed above, implementations of embodiments of the present invention enhance the user of fixed-type scanning devices by allowing visual operator feedback in the form of views of normally hidden surfaces of items being scanned. These views may be shown on a mirror or specular surface. The goal is to provide as much ease to the operator to aim optical codes or bar codes at a scanner. The scanning camera's field of view is shown as a target on the surface. As the operator lines up the reflected object with the target on the surface, the operator knows the object will be in the field of view of the camera. Thus, the camera can automatically capture the image of the object as it detects the object has been placed in its field of view by way of the alignment with the target on the surface.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A data capture system with virtual aiming, comprising:
   a scanning camera positioned to receive an image of a first item's data through a mirror having both transmissive and reflective properties, wherein the mirror is positioned between the scanning camera and the first item;
   the first item's data partially shares a field of view with an operator's visual field of the mirror, wherein the operator sees a reflection in the mirror of the image of the first item's data positioned by the operator on a first side of the mirror;
   an aiming pattern transmitted towards a second side of the mirror such that that the aiming pattern appears on the first side of the mirror due to the transmissive properties of the mirror; and
   the mirror located so that the operator can aim the first item's data at the aiming pattern,
   wherein the operator has a first line of sight to the first item's data from the reflection in the mirror, and
   wherein the operator aligns the first item's data with the aiming pattern on the first side of the mirror so that the scanning camera has a second line of sight to the first item's data and the scanning camera captures an image of the first item's data.

2. The data capture system of claim 1, wherein the operator aligns the first item's data with the aiming pattern on the first side of the mirror comprises the operator places the first item's data in a targeted scan zone of the scanning camera defined by the aiming pattern located on the first side of the mirror.

3. The data capture system of claim 2, wherein the aiming pattern transmitted towards the mirror comprises a pattern of light emitting diodes (LEDs) arranged to emit light towards the mirror, wherein the pattern of LEDs is located with the scanning camera.

4. The data capture system of claim 2, wherein the aiming pattern transmitted towards the mirror comprises a light source that illuminates a graphic target whereby the aiming pattern is emitted from the graphic target towards the mirror, wherein the light source is aimed at the graphic target and is positioned between the mirror and the scanning camera, and the graphic target is located with the scanning camera.

5. The data capture system of claim 2, wherein the aiming pattern transmitted towards the mirror comprises a light source that illuminates a graphic target whereby the aiming pattern is emitted from the graphic target towards the mirror, wherein the light source is aimed at the graphic target, the graphic target is positioned between the mirror and the light source, and the graphic target is located with the scanning camera.

6. The data capture device of claim 5, further comprising the light source provides pulses of light over the graphic target to improve image contrast and aid exposure in the scanning camera.

7. The data capture system of claim 2, wherein the aiming pattern transmitted towards the mirror comprises a light source that illuminates the edges of a transparent or semi-transparent plate whereby the illuminated edges causes the aiming pattern to be emitted from the transparent or semi-transparent plate towards the mirror, wherein the light source is aimed at the transparent or semi-transparent plate and is positioned between the mirror and the scanning camera, and the transparent or semi-transparent plate is located with the scanning camera.

8. The data capture system of claim 2, wherein the first item's data is an optical code.

9. The data capture system of claim 2, wherein the light source is a light emitting diode.

10. The data capture system of claim 2, wherein the aiming pattern is selected from a group including a rectangle, a circle, nested rectangles, concentric circles, crosshairs, an 'X', arrows, spirals, and asterisks.

11. The data capture device of claim 2, further comprising a set of illuminator light emitting diodes (LEDs) that faces toward the first item's data and illuminates the first item's data.

12. The data capture device of claim 11, wherein the set of illuminator LEDs pulse over the first item's data to improve image contrast and aid exposure in the scanning camera.

13. An imaging scanner with enhanced usability and aiming, comprising:
    a scanner window formed in a spherical or convex shape and coated with a partially reflective layer;
    the scanner window forms a virtual image of an optical code that is located a distance from the imaging scanner;
    an aiming frame, which is illuminated and originates from an aiming source, that shows a field of view of a scanning camera on the scanner window; and
    the scanning camera that captures an image of the optical code, when the optical code is positioned so that the virtual image of the optical code as viewed by the operator is placed in or over the aiming frame at the scanner window.

14. The imaging scanner of claim 13, wherein the optical code is located at one side of the scanner window, and the aiming source and the scanning camera are located at an opposite side of the scanner window.

* * * * *